US012198661B2

(12) United States Patent
Cooper

(10) Patent No.: US 12,198,661 B2
(45) Date of Patent: Jan. 14, 2025

(54) MUSIC SYNTHESIZER WITH SPATIAL METADATA OUTPUT

(71) Applicant: DOLBY LABORATORIES LICENSING CORPORATION, San Francisco, CA (US)

(72) Inventor: David Matthew Cooper, New South Wales (AU)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 0 days.

(21) Appl. No.: 18/688,627

(22) PCT Filed: Aug. 24, 2022

(86) PCT No.: PCT/US2022/041414
§ 371 (c)(1),
(2) Date: Mar. 1, 2024

(87) PCT Pub. No.: WO2023/034099
PCT Pub. Date: Mar. 9, 2023

(65) Prior Publication Data

US 2024/0265897 A1 Aug. 8, 2024

Related U.S. Application Data

(60) Provisional application No. 63/240,383, filed on Sep. 3, 2021.

(30) Foreign Application Priority Data

Sep. 3, 2021 (EP) .................................... 21194849

(51) Int. Cl.
*G10H 1/00* (2006.01)
*G10H 1/057* (2006.01)
(Continued)

(52) U.S. Cl.
CPC ........... *G10H 1/0008* (2013.01); *G10H 1/057* (2013.01); *G10H 1/46* (2013.01); *G10H 5/002* (2013.01);
(Continued)

(58) Field of Classification Search
CPC ........ G10H 1/0008; G10H 1/057; G10H 1/46; G10H 5/002; G10H 2210/305; G10H 2250/025
(Continued)

(56) References Cited

U.S. PATENT DOCUMENTS 7,005,571 B1 * 2/2006 Groff .................. G10H 1/0066 84/645
8,893,176 B2 * 11/2014 Kim ................. H04N 21/23614 725/110
(Continued)

FOREIGN PATENT DOCUMENTS

CN 101779245 A 7/2010
CN 103109549 B 12/2016
(Continued)

OTHER PUBLICATIONS

Morrell et al: "Dynamic Panner: An Adaptive Digital Audio Effect for Spatial Audio," Oct. 1, 2009, Audio Engineering Society Convention Paper 7931, URL:http://www.aes.org/e-lib/inst/download.cfm/15126.pdf?ID=15126, pp. 1-20.

*Primary Examiner* — Christina M Schreiber

(57) ABSTRACT

Described are apparatus for generating and/or processing audio signals. One apparatus includes: a first stage for obtaining an audio signal; a second stage for modifying the audio signal based on one or more control signals for shaping sound represented by the audio signal; a third stage for generating spatial metadata related to the modified audio signal, based at least in part on the one or more control signals; and an output stage for outputting the modified
(Continued)

audio signal together with the generated spatial metadata. Also described are corresponding methods, as well as corresponding programs and computer-readable storage media.

25 Claims, 4 Drawing Sheets

(51) Int. Cl.
*G10H 1/46* (2006.01)
*G10H 5/00* (2006.01)

(52) U.S. Cl.
CPC . *G10H 2210/305* (2013.01); *G10H 2250/025* (2013.01)

(58) Field of Classification Search
USPC ............................................................. 84/702
See application file for complete search history.

(56) References Cited

U.S. PATENT DOCUMENTS

| | | | | |
|---|---|---|---|---|
| 9,516,446 | B2 * | 12/2016 | Xiang | G10L 19/008 |
| 10,491,643 | B2 * | 11/2019 | Brown | H04S 7/306 |
| 10,649,580 | B1 * | 5/2020 | Smith | G06F 3/04815 |
| 10,657,940 | B1 * | 5/2020 | Calder | G10H 1/32 |
| 10,674,262 | B2 * | 6/2020 | Vilkamo | G10L 25/18 |
| 10,785,589 | B2 * | 9/2020 | Tammi | G10L 19/008 |
| 10,848,869 | B2 * | 11/2020 | Laitinen | H04S 7/305 |
| 10,971,163 | B2 * | 4/2021 | Hirvonen | G10L 19/00 |
| 2002/0005111 | A1 * | 1/2002 | Ludwig | G10H 1/00 84/645 |
| 2012/0057715 | A1 * | 3/2012 | Johnston | H04S 7/30 381/63 |
| 2013/0114819 | A1 * | 5/2013 | Melchior | H04S 7/30 381/59 |
| 2015/0178930 | A1 * | 6/2015 | Gao | G06F 16/78 382/103 |
| 2018/0014139 | A1 * | 1/2018 | Dickins | H04S 7/303 |
| 2020/0145776 | A1 * | 5/2020 | Herre | G06F 3/011 |
| 2020/0154229 | A1 * | 5/2020 | Habets | G10L 19/008 |
| 2020/0228913 | A1 * | 7/2020 | Herre | G06F 3/0346 |
| 2020/0260206 | A1 * | 8/2020 | Vilkamo | H04R 5/027 |
| 2020/0374649 | A1 * | 11/2020 | Hestermann | G10L 19/00 |
| 2021/0051430 | A1 * | 2/2021 | Eronen | G10L 19/008 |
| 2021/0051435 | A1 * | 2/2021 | Yen | H04S 3/004 |
| 2021/0329405 | A1 * | 10/2021 | Eubank | H04S 7/305 |
| 2022/0295207 | A1 * | 9/2022 | Breebaart | H04S 7/301 |
| 2022/0303710 | A1 * | 9/2022 | Vilkamo | G10L 21/0364 |
| 2022/0328056 | A1 * | 10/2022 | Vilkamo | G10L 21/0208 |
| 2023/0368759 | A1 * | 11/2023 | Johnson | G10H 1/361 |
| 2024/0005897 | A1 * | 1/2024 | Sumi | G10H 1/0091 |
| 2024/0265897 | A1 * | 8/2024 | Cooper | G10H 5/002 |

FOREIGN PATENT DOCUMENTS

| | | | | | |
|---|---|---|---|---|---|
| CN | 110915220 | B | | 6/2021 | |
| CN | 117897765 | A | * | 4/2024 | G10H 1/0008 |
| EP | 2434782 | A2 | | 3/2012 | |
| GB | 2606538 | A | * | 11/2022 | G10H 1/0008 |
| JP | 2021089437 | A | | 6/2021 | |
| JP | 2021119708 | A | | 8/2021 | |
| JP | 2024028526 | A | * | 3/2024 | G10L 19/008 |
| WO | 2012094335 | A1 | | 7/2012 | |
| WO | 2013006338 | A2 | | 1/2013 | |
| WO | 2014187991 | A1 | | 11/2014 | |
| WO | WO-2016207625 | A2 | * | 12/2016 | A63B 69/00 |
| WO | 2018060550 | A1 | | 4/2018 | |
| WO | WO-2020089523 | A1 | * | 5/2020 | G10L 19/008 |
| WO | 2020144062 | A1 | | 7/2020 | |
| WO | 2020201620 | A1 | | 10/2020 | |
| WO | 2021021460 | A1 | | 2/2021 | |
| WO | 2021058858 | A1 | | 4/2021 | |
| WO | 2021214380 | W | | 10/2021 | |
| WO | WO-2021214380 | A1 | * | 10/2021 | G10L 19/008 |
| WO | WO-2021240053 | A1 | * | 12/2021 | G10L 19/008 |
| WO | WO-2023034099 | A1 | * | 3/2023 | G10H 1/0008 |

* cited by examiner

MUSIC SYNTHESIZER WITH SPATIAL METADATA OUTPUT

CROSS-REFERENCE TO RELATED APPLICATIONS

This application is a U.S. National Stage application under U.S.C. 371 of International Application No. PCT/US2022/041414, filed on 24 Aug. 2022 (reference: D21053WO01), which claims priority U.S. provisional application 63/240,383 (reference: D21053USP1), filed 3 Sep. 2021 and EP application Ser. No. 21/194,849.2 (reference: D21053EP), filed 3 Sep. 2021, each of which are hereby incorporated by reference in their entireties.

TECHNICAL FIELD

The present disclosure relates to methods and apparatus for generating and/or processing audio signals. The present disclosure further describes techniques for synthesizing or processing sound with spatial metadata output. These techniques may be applied, for example, to music synthesizers and audio processors.

BACKGROUND

A synthesizer is an electronic musical instrument that generates audio signals. In general, an electronic musical instrument uses electronic circuitry to create sound, often in reaction to user input. In the broadest sense this could incorporate analogue instruments, DSP-based instruments running on either dedicated hardware or on a computer as a "virtual" instrument, or sample-based instruments.

Existing synthesizers generate audio signals that are mono, stereo or multi-channel. This means that when used in an object-based production (e.g., a Dolby Atmos® production), a spatialization process separate from the sound generation process is applied to represent the synthesizer audio signals as objects. Currently this is achieved by first rendering the output of the synthesizer for a particular channel configuration, importing that rendered audio into a Digital Audio Workstation (DAW), such as Pro Tool, and then generating associated spatial metadata with a panner.

Generally, there is need for improved techniques for object-based production of sound signals generated by synthesizers, and/or for object-based production of sound signals processed by audio processors.

SUMMARY

In view of the above, the present disclosure provides apparatus for generating and/or processing audio signals as well as corresponding methods, computer programs, and computer-readable storage media, having the features of the respective independent claims.

According to an aspect of the disclosure, an apparatus for generating or processing audio signals is provided. The apparatus may include a first stage for obtaining an audio signal. The apparatus may further include a second stage for modifying the audio signal based on one or more control signals for shaping (e.g., modifying, altering) sound represented by the audio signal. The control signals may be generated by one or more modulators that affect how the audio signal is modified. The one or more modulators may relate to or comprise low frequency oscillators (LFOs) and/or envelopes, for example. The apparatus may further include a third stage for generating spatial metadata related to the (modified) audio signal, based at least in part on the one or more control signals. The spatial metadata may be metadata for instructing an external device on how to render the modified audio signal. For example, the spatial metadata may be metadata for object-based rendering. It may include, for example, an indication of a position (e.g., a cartesian position in 3D space) and/or a size of an audio object relating to (e.g., represented by) the audio signal. The apparatus may yet further include an output stage for outputting the modified audio signal together with the generated spatial metadata. In some implementations, more than one audio signal (i.e., a plurality of audio signals) may be processed in parallel by the apparatus. In some other implementations, more than one audio signal (i.e., a plurality of audio signals) may be serially processed. For example, in some such implementations, processing for a given audio signal may depend on an earlier audio signal and/or its metadata. As another example, in some implementations, the processing may involve modifying already existing spatial metadata of an audio signal obtained by the first stage.

Configured as above, the technique implemented by the proposed apparatus significantly broadens the range of the available creative options in object-based production and allows handling spatialization as an integrated part of the sound-design process. Moreover, laborious editing of spatial metadata can be avoided and creative intent that has led to specific shaping operations for audio signals can be directly and efficiently implemented in the spatial metadata. In some embodiments, the second stage may be adapted to apply a time-dependent modification to the audio signal. Therein, the time dependency of the modification may depend on the one or more control signals. The one or more control signals may be time-dependent. Thereby, the underlying time dependence of the intended behavior of a sound source can be readily used for describing the spatial properties of an audio object describing/representing the sound source.

In some embodiments, the second stage may include at least one of the following for modifying the audio signal: a filter; an amplifier; a low frequency oscillator; an audio delayer; a driver; and a flanger.

In some embodiments, the second stage may be adapted to apply a filter to the audio signal. It is understood that the second stage may include the filter. The filter may be any one of a high-pass filter, low-pass filter, band-pass filter, or notch filter, for example. A characteristic frequency of the filter may be controlled by (e.g., based on) the one or more control signals. Accordingly, the characteristic frequency may be time-dependent. The characteristic frequency of the filter may be a cutoff frequency, for example. The one or more (time-dependent) control signals may be generated by an LFO, for example. Thereby, the characteristic frequency may change periodically in some implementations.

In some embodiments, the second stage may be adapted to apply an amplifier to the audio signal. It is understood that the second stage may include the amplifier. A gain of the amplifier may be controlled by (e.g., based on) the one or more control signals. Accordingly, the gain may be time-dependent. The one or more control signals may be generated by an LFO, for example. Thereby, the gain may change periodically in some implementations.

In some embodiments, the second stage may be adapted to apply an envelope to the audio signal by using the amplifier. Then, the third stage may be adapted to generate the spatial metadata based at least in part on a shape of the envelope. For example, the spatial metadata may indicate a time-dependent position of an audio object, with the position changing in accordance with the shape of the envelope (e.g., experiencing linear translation while the envelope indicates non-vanishing gain).

In some embodiments, obtaining the audio signal may include generating the audio signal by using one or more oscillators. It is understood that the first stage may comprise the one or more oscillators. Such apparatus may relate to synthesizers, such as a music synthesizers, for example.

In some embodiments, the audio signal may be generated, by the one or more oscillators, based at least in part on the one or more control signals. For example, at least one of frequency, pulse width, and phase of the one or more oscillators may be controlled by (e.g., based on) the one or more control signals. Thereby, control signals that affect generation of the audio signal(s) can be used as basis for generating the spatial metadata. This provides additional functionality for capturing artistic intent when generating the spatial metadata.

Alternatively, obtaining the audio signal may include receiving the audio signal. The audio signal may be received from an external source, such as a sound database, for example. Such apparatus may relate to audio processors, such as an effects audio processors, for example.

In some embodiments, the one or more control signals may be based at least in part on user input.

In some embodiments, the output stage may be adapted to output one or more audio streams based on the modified audio signal, together with the generated spatial metadata. For example, there may be one spatial metadata stream for each output audio stream. Further, when more than one audio signals are processed in parallel by the apparatus, there may be one output audio stream for each (modified) audio signal. Alternatively, at least one of the output audio streams may be generated by mixing two or more (modified) audio signals.

According to another aspect of the disclosure, a method of generating or processing audio signals is provided. The method may include obtaining an audio signal. The method may further include modifying the audio signal based on one or more control signals for shaping sound represented by the audio signal. The method may further include generating spatial metadata related to the (modified) audio signal, based at least in part on the one or more control signals. The method may yet further include outputting the modified audio signal together with the generated spatial metadata.

In some embodiments, the one or more control signals may be time-dependent.

In some embodiments, the spatial metadata may be metadata for instructing an external device on how to render the modified audio signal.

In some embodiments, modifying the audio signal may include applying a time-dependent modification to the audio signal. Therein, the time dependency of the modification may depend on the one or more control signals.

In some embodiments, the method may further include modifying the audio signal by at least one of: a filter; an amplifier; a low frequency oscillator; an audio delayer; a driver; and a flanger.

In some embodiments, modifying the audio signal may include applying a filter to the audio signal. Therein, a characteristic frequency of the filter may be controlled by the one or more control signals.

In some embodiments, the characteristic frequency of the filter may be a cutoff frequency.

In some embodiments, modifying the audio signal may include applying an amplifier to the audio signal. Therein, a gain of the amplifier may be controlled by the one or more control signals.

In some embodiments, modifying the audio signal may include applying an envelope to the audio signal by using the amplifier. Then, generating the spatial metadata may be based at least in part on a shape of the envelope.

In some embodiments, obtaining the audio signal may include generating the audio signal by using one or more oscillators.

In some embodiments, the audio signal may be generated, by the one or more oscillators, based at least in part on the one or more control signals.

Alternatively, obtaining the audio signal may include receiving the audio signal.

In some embodiments, the one or more control signals may be based at least in part on user input.

In some embodiments, outputting the modified audio signal may include outputting one or more audio streams based on the modified audio signal, together with the generated spatial metadata.

According to another aspect, a computer program is provided. The computer program may include instructions that, when executed by a processor (e.g., computer processor, server processor, etc.), cause the processor to carry out all steps of the methods described throughout the disclosure.

According to another aspect, a computer-readable storage medium is provided. The computer-readable storage medium may store the aforementioned computer program.

According to yet another aspect an apparatus including a processor and a memory coupled to the processor is provided. The processor may be adapted to carry out all steps of the methods described throughout the disclosure. This apparatus may relate to a computer system, a server (e.g., cloud-based server), or to a system of servers (e.g., system of cloud-based servers), for example.

It will be appreciated that apparatus features and method steps may be interchanged in many ways. In particular, the details of the disclosed method(s) can be realized by the corresponding apparatus, and vice versa, as the skilled person will appreciate. Moreover, any of the above statements made with respect to the method(s) (and, e.g., their steps) are understood to likewise apply to the corresponding apparatus (and, e.g., their blocks, stages, units, etc.), and vice versa.

BRIEF DESCRIPTION OF DRAWINGS

Example embodiments of the disclosure are explained below with reference to the accompanying drawings, wherein.

DETAILED DESCRIPTION

The Figures (Figs.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed apparatus (or method) for purposes of illustration only. One skilled in the art will readily recognize from the following description that alternative embodiments of the structures and methods illustrated herein may be employed without departing from the principles described herein.

The present disclosure generally relates to music synthesizers (and audio processors) with spatial metadata output. Generation of the metadata may be driven by control signals relating to direct/literal user input and/or internal modulation signals. As such, the control signals typically are time-dependent.

Broadly speaking, a synthesizer can be thought of as a collection of connected sound generation/shaping elements and modulation elements. The sound generation/shaping elements create or directly act upon audio signals. For example, oscillators can produce raw tones/waveforms and then filters can shape their timbre and amplifiers can introduce level dynamics. To animate the sounds produced, these elements should change over time, and this is done by applying the modulation elements, which instead of making sound themselves, influence the behavior of the sound generation/shaping elements.

Figure 1:
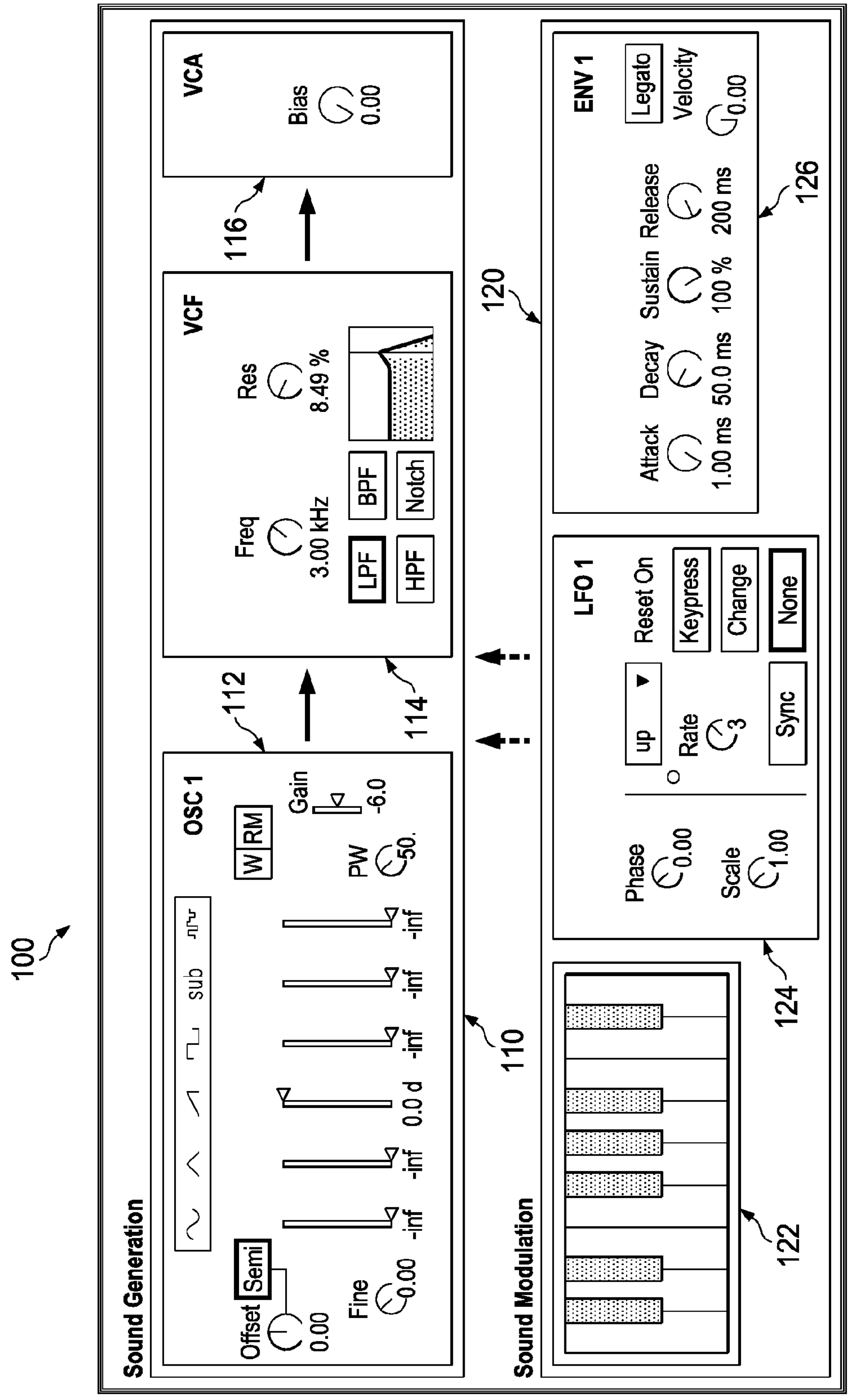
FIG. 1 is a block diagram schematically illustrating an example of a synthesizer.

A simple example of a synthesizer 100 is shown in FIG. 1. The synthesizer 100 comprises a sound generation block (or stage, module, etc.) 110 and a sound modulation block (or stage, module, etc.) 120. The sound generation block 110 in turn includes one or more oscillators (oscillator elements) 112, one or more filters (e.g., voltage-controlled filters (VCFs)) 114, and one or more amplifiers (e.g., voltage-controlled amplifiers (VCAs)) 116, for example. The sound modulation block 120 can modulate the actual generation of audio signals by the oscillator(s) 112, and/or any subsequent shaping of the sound signal, for example by the filter(s) 114 or the amplifier(s) 116. Here and in the following, it is understood that an audio signal may be the electronic representation of a sound signal. It is further understood that the shaping of sound corresponds to a modification/alteration of the audio signal representing the sound.

For example, the sound modulation block 120 can comprise a Low Frequency Oscillator (LFO) 124 that is capable of producing a cyclically sub-audio (e.g., below 20 Hz) frequency output. This LFO 124 could be used to modulate the cutoff frequency of a filter (e.g., filter 114), or any other characteristic frequency of the filter. Another common element is an envelope 126 that generates a one-off modulation pattern (e.g., by means of the amplifier(s) 116) to a sound signal generated by the sound generation block 110. These modulation elements will often be paired with a control surface 122 operated for example by a musician, such as a keyboard or sequencer. As such, modulation can depend on user input and in general can be time-dependent.

These aforementioned elements of the sound generation block 110 and or the sound modulation block 120 could be realized with DSP, analog circuits, digital circuits or any combination(s) thereof.

The output stage of the synthesizer 100 (not shown in FIG. 1) can comprise a mixing circuit, combining internal audio signals (and optionally, effects), the output of which is one or more audio signals. When multiple audio signals are output, it is possible that the synthesizer 100 can be configured to output a signal set that has some notion of spatiality, such as a stereo signal or even a multi-channel signal. Further, internal modulation signals such as LFO-generated signals can be used to affect spatial qualities, such as pan position, for example. In this case, the output is effectively rendered. The internal signals that are mixed together in the output stage might be the oscillator element 112 outputs being mixed to form a voice signal, or (e.g., in a multi-voice synthesizer) multiple voice signals, which could be based on oscillators, sample-playback, or any other suitable tone-generating technique. Instead of being mixed together, these signals could also be output from the synthesizer 100 individually.

Accordingly, synthesizer 100 is based around a rendered channel output, such as mono or stereo, or even multichannel output (e.g., 3.1.2 multichannel output, 5.1 multichannel output, 5.1.2 multichannel output, 7.1.4 multichannel output, etc.).

A number of approaches are feasible for generating stereo output in synthesizers. One approach for generating stereo from mono is by use of effects such as chorus, flanger, delay, or reverb. The synthesizer architecture can be primarily mono, with a final stage effects processor that has a mono input and then applies different processing to create a left and right signal to create a stereo output. In some cases, the final stage effects processor may relate to a chorus effect output stage.

Another approach is to allow the user to pan the voices in the stereo field. This panning may be entirely manual or tied to some property of the sound such as pitch or may be modulated over time with, for example, an LFO.

Further, multi-timbral synthesizers have the ability to simultaneously play back more than one program at a time. This allows to assign one program to a Lower Patch and one to an Upper Patch. These different programs or patches can then be positioned across the stereo field.

The channel-rendered output of the synthesizer 100 can be used in an object-based workflow by taking this rendered output and then using a secondary tool to generate spatial meta-data, such as the Dolby Atmos® Panner, for example.

Accordingly, when synthesizers are used in an object-based (e.g., Dolby Atmos®) production, the output must first be rendered and then, in a second step, spatialized. This means that any sound-design decisions are finalized, with the internal modulation signals that were used to create the output now unavailable. This limits the available creative options and makes it very hard to consider spatialization as an integrated part of the sound-design process.

Figure 2:
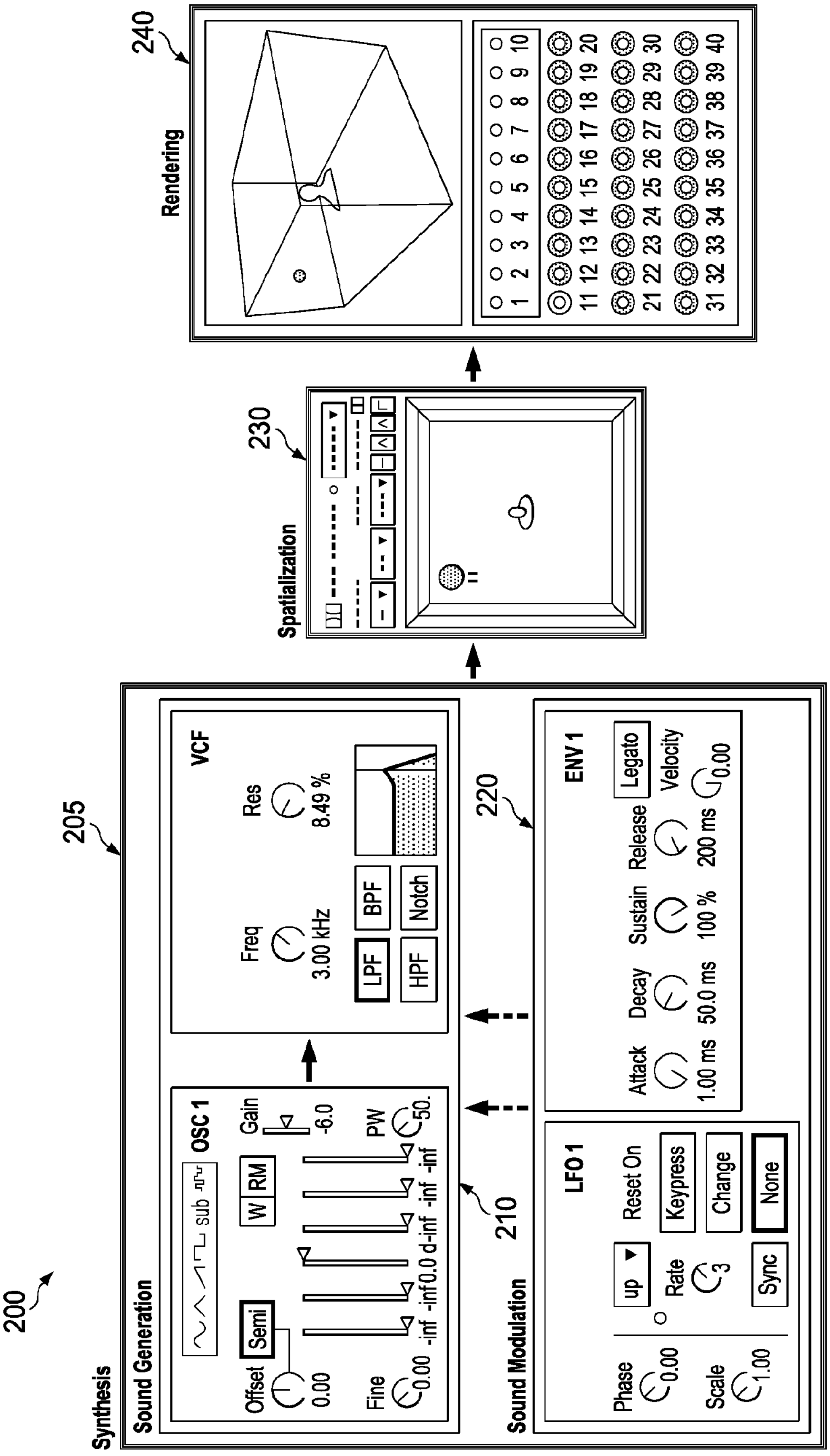
FIG. 2 is a block diagram schematically illustrating an audio processing chain including a synthesizer, a spatialization module, and an object-based rendering module.

An example of a processing chain 200 for such object-based sound-design process is illustrated in the block diagram of FIG. 2. The processing chain 200 comprises a synthesizer 205, a spatialization module 230, and an object-based rendering module (e.g., Dolby Atmos Production Suite) 240. The synthesizer 205 may correspond to synthesizer 100 described above and may comprise a sound generation block 210 and a sound modulation block 220. The output of the synthesizer 205 is rendered to a specific (e.g., predefined) channel configuration, such as mono or stereo, or even a multichannel configuration (e.g., 3.1.2 multichannel output, 5.1 multichannel output, 5.1.2 multichannel output, 7.1.4 multichannel output, etc.). This rendered channel-based output is then fed to the spatialization module 230. The spatialization module 230 processes the channel-based output of the synthesizer 205 to create object-based audio content therefrom. The object-based audio content generated by the spatialization module 230 can then be used for object-based rendering by the object-based rendering module 240, to a desired (in principle arbitrary) channel configuration (e.g., depending on an intended speaker layout).

An example illustrating potential issues that might occur when using processing chain 200 for object-based rendering is described next. According to the example, an LFO may be used to rhythmically change the filter cutoff frequency of a filter in the sound generation block 210. It may be desirable to also affect the spatial elevation of the signal with the LFO so that the filter cutoff frequency is synchronized with the elevation. However, doing so would be laborious when using processing chain 200. That is, the rhythmical change of the cutoff frequency may be intended to signify or to conform to movement (e.g., vertical movement) of a sound source. When generating spatial metadata for expressing this movement based on rendered channel-based output of the synthesizer 205, the internal modulation signals that had controlled adaptation of the cutoff frequency are not available anymore. Instead, the intended spatial movement can only be indirectly inferred from the channel(s) of the channel-based output, which may be laborious and/or inaccurate. Generation of appropriate spatial metadata for more complex examples, such as situations in which synthesizer voice elevation positions are individually modulated with one or more LFOs, would be even more laborious, or even impossible, as these voices will have been mixed together.

Techniques according to the present disclosure relate to the incorporation of object spatialization within the synthesizer (or audio processor) architecture. This change allows the internal control signals (internal modulation signals) of the synthesizer that are used to shape the sound, to also be used to influence the spatialization. The synthesizer will then be able to directly generate spatial metadata alongside the audio, without need for an intermediate rendering step. Accordingly, techniques according to the present disclosure directly output a collection of one or more audio streams and associated spatial metadata. This collection of signals can then be rendered or further processed and then rendered for playback.

This approach means that internal control signals or GUI controls that are used to position the object output can also be used to adjust other aspects of the sound-generation (or vice versa). Further, individual oscillators can be output as objects, and also individual synthesizer voices can be output as objects.

Even though the present disclosure may make frequent reference to synthesizers (e.g., music synthesizers), it is understood that the presented techniques can be likewise applied to audio processors (e.g., audio effects processors), unless indicated otherwise. As such, the present disclosure may generally relate to apparatus for generating or processing audio signals (sound signals).

Figure 3:
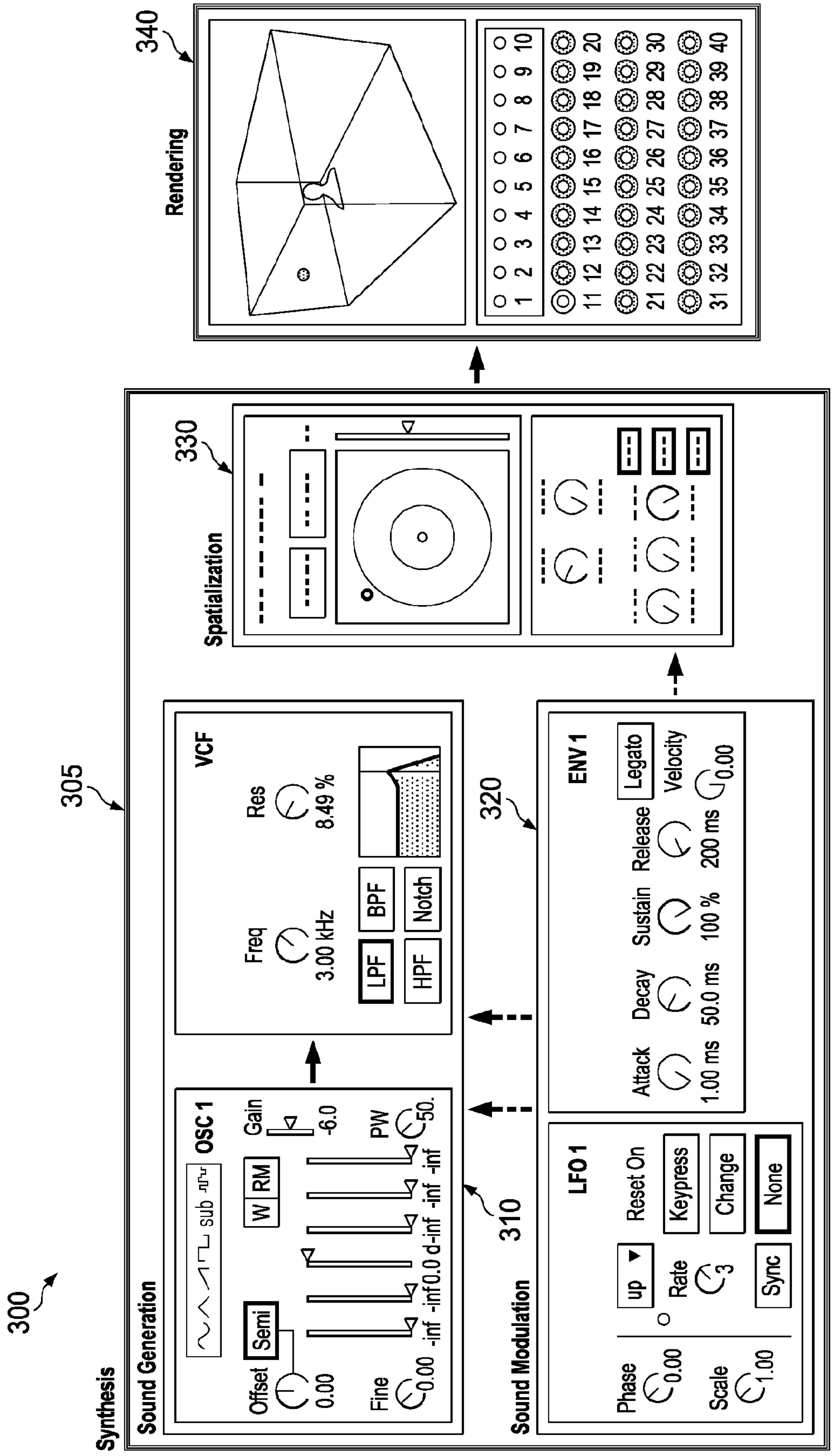
FIG. 3 is a block diagram illustrating an example of a synthesizer according to embodiments of the disclosure.

An example of an audio processing chain 300 comprising a synthesizer 305 in line with techniques according to the present disclosure is schematically illustrated in FIG. 3. Processing chain 300 comprises the synthesizer 305 and an object-based rendering module 340 (separate from the synthesizer) for object-based rendering of the synthesizer's output.

Broadly speaking, the present disclosure proposes to incorporate a spatial output element (e.g., the third stage described below) that, for each signal to be output, generates a corresponding spatial metadata stream (or spatial metadata in general), wherein the spatial metadata instructs an external rendering unit on how to render that signal. In particular, the metadata stream may describe its associated audio signal's spatial properties over time, such as cartesian position (e.g., in 3D space) and/or size. As such, the spatial metadata may be metadata for object-based rendering of an audio object, wherein the audio track of the audio object is given by the audio signal. One example of such spatial metadata is Dolby Atmos® metadata. In general, this spatial metadata may be generated by direct and literal user input. But at the same time, it may also be derived from the modulation signals (control signals) that can also be used to generate and/or shape the associated audio signals. Furthermore, this spatial metadata may be generated by a combination of direct and literal user input and derived from the modulation signals (control signals) that can also be used to generate and/or shape the associated audio signals.

The synthesizer 305 comprises a sound generation block 310, a sound modulation block 320, and a spatialization block 330. The synthesizer may further comprise an output stage (not shown in FIG. 3) for outputting audio signals/streams together with associated spatial metadata.

The sound generation block 310 may comprise any of the elements described above for sound generation block 110 of synthesizer 100, such as oscillators, filters and/or amplifiers, as well as and other elements for shaping sound that has been generated by the oscillator(s). As such, sound generation by sound generation block 310 may proceed in the same manner as by sound generation block 110 described above. This does not exclude that sound generation block 310 comprises additional elements and/or has additional functionalities not described above. Further examples of possible elements of the sound generation block 310 will be given below.

In general, conceptually, the sound generation block 310 may be seen as implementing a first stage for obtaining an audio signal, and a second stage for modifying the audio signal (e.g., for shaping sound represented by the audio signal).

In line with the above, the first stage of synthesizer 305 in FIG. 3 may comprise one or more oscillators (i.e., the oscillator(s) of the sound generation block 310). These one or more oscillator(s) may be used by the first stage to generate the audio signal(s). For instance, individual oscillators among the one or more oscillators may be analog-style oscillators, FM-style oscillators, or wavetable-style oscillators. Depending on their style/implementation, these oscillators may have different operation parameters (e.g., oscillator parameters). For example, an analog-style oscillator may have frequency, pulse width, and/or gain/level as operation parameters. An FM-style oscillator may have frequency, ratio, depth of FM, and/or gain/level as operation parameters. Further, a wavetable-style oscillator may have frequency, wave index, bank index, and/or gain/level as operation parameters.

Also, generation of the audio signal by the one or more oscillators may be based at least in part on the one or more control signals. For example, the operation parameter(s) of the one or more oscillators (e.g., frequency, pulse width, and/or phase, and/or any of the aforementioned operation parameters) may be modulated under control of the one or more control signals.

While the above implementation of the first stage relates to a synthesizer (e.g., music synthesizer), the present disclosure also relates to implementations (not shown in FIG. 3) in which first stage receives the audio signal(s). For example, the audio signal(s) may be received from an external source (e.g., audio database, sound database). Such implementations may relate to audio processors, such as effects audio processors.

In general, more than one audio signal (i.e., a plurality of audio signals) may be processed in parallel by the synthesizer or audio processor (i.e., apparatus for generating or processing audio signals in general). For such implementations, also combinations of (internally) generating and receiving audio signals may be feasible, for example implementations in which some audio signals are generated by oscillators and some (other) audio signals are received from an external source.

In line with the above, while reference is-without intended limitation-frequently made to synthesizers, embodiments of the present disclosure likewise relates to audio processors. The difference between these different implementations resides in whether the audio signals that are subsequently modified and supplemented with spatial metadata are (internally) generated, or received. It is understood that any other elements/functionalities of the described synthesizers likewise apply to audio processors. That is, apart from how the audio signal(s) is/are obtained (i.e., generated or received), audio processors may have the same functionalities as the synthesizers described throughout the disclosure.

As described above, the second stage of the synthesizer 305 is a stage for modifying the audio signal (e.g., for shaping sound represented by the audio signal). Modifying the audio signal is based on one or more (internal) control signals (e.g., internal modulation signals). The control signals may thus also be referred to as control signals for shaping sound represented by the audio signal. As described above, the control signals may be time-dependent (i.e., may vary over time). Accordingly, the second stage may be adapted to apply a time-dependent modification to the audio signal. The time dependence of the modification may depend on the one or more control signals.

The second stage may comprise filters (e.g., VCFs) and/or amplifiers (e.g., VCAs). In general, the second stage may comprise any, some, or all of the following elements for modifying the audio signal: one or more filters (e.g., VCFs), one or more amplifiers (e.g., VCAs), one or more LFOs, one or more audio delayers, one or more drivers, and one or more flangers. The second stage may also comprise sound shaping elements such as chorus and reverb, for example. All these elements may have respective operation parameters (e.g., synthesizer parameters, or audio processor parameters) that can be modified/changed/modulated in accordance with the one or more control signals.

For example, an amplifier may have a gain as an operation parameter. A filter may have cutoff frequency and/or resonance (resonance frequency) as operation parameters. An LFO may have rate and/or scale as operation parameters. A delayer (delay effect) may have time, mix, and/or feedback as operation parameters. A driver (drive effect) may have drive and/or mix as operation parameters. Further, a flanger (flanger effect) may have center, width, rate, regeneration, and/or mix as operation parameters.

For each of such operation parameters that are modified, there may be a respective control signal that controls modification/modulation of this operation parameter. Control signals may be generated by respective modulation sources. Examples of modulation sources may include LFO(s) and/or envelope(s).

In a first non-limiting example, the second stage may comprise or implement a filter (e.g., VCF) that can be applied to the audio signal output from the first stage. In this case, a characteristic frequency of the filter may be controlled by the one or more control signals. In this sense, the characteristic frequency of the filter may be time-dependent. If the respective control signal is periodic (e.g., generated by an LFO), the characteristic frequency may change periodically. In line with the above, the characteristic frequency of the filter may be the cutoff frequency. Alternatively, the characteristic frequency may be the resonance frequency.

In a second non-limiting example, the second stage may comprise or implement an amplifier (e.g., VCA) that can be applied to the audio signal output from the first stage. In this case, the gain of the amplifier may be controlled by the one or more control signals. In this sense, the gain of the amplifier may be time-dependent. If the respective control signal is periodic (e.g., generated by an LFO), the gain may change periodically.

Specifically, in the second example, the second stage may use the amplifier for applying an envelope (e.g., gain profile) to the audio signal. In this case, the corresponding control signal for the amplifier may represent the envelope.

The control signals may be generated by modulators (such as LFOs, for example), as described above. In some implementations, at least some of the modulators may in turn be modulated by other modulators, under control of respective control signals. Moreover, there may be built-in effects that are modulated as well.

The (internal) control signal(s) of the synthesizer 305 may be generated by the sound modulation block 320, which may comprise the same elements as the modulation block 120 of synthesizer 100 described above. As such, sound modulation by sound modulation 320 may proceed in the same manner as by sound modulation block 120 described above. This does not exclude that sound modulation block 320 comprises additional elements and/or has additional functionalities not described above.

In general, the control signals may be generated by one or more modulators that affect how the audio signal is modified. The one or more modulators may relate to or comprise LFOs, for example. As noted above, also operation parameters of the one or more modulators may themselves be subject to time-dependent modulation under control of appropriate control signals. As is exemplified by the control surface (e.g., keyboard, control panel) 122 shown in FIG. 1, the one or more control signals may also be based, at least in part, on user input.

The spatialization block 330 may be seen as relating to or implementing a third stage of the synthesizer 305 for generating spatial metadata related to the modified audio signal. As noted above, this is done based at least in part on the one or more control signals. Here and in the following, it is understood that the spatial metadata may be metadata for instructing an external device (e.g., a renderer or rendering module) on how to render the modified audio signal.

It is understood that any of the control signals (e.g., the control signals described above) may be taken as basis for generating the spatial metadata. For example, these control signals may be used as basis for determining at least one of a position of the corresponding audio object in the horizontal plane, an elevation of the corresponding audio object, and a size of the audio object. If the position of the audio object in a given plane (e.g., horizontal plane) is determined based on the control signal(s), parameters of a linear translation may be determined (e.g., calculated) from a control signal, such as a control signal representing a time-dependent gain or gain profile. Likewise, parameters of a periodic motion (e.g., circular or elliptic motion) of the audio object in a given plane (e.g., horizontal plane) may be determined (e.g., calculated) based on a periodic control signal, such as a control signal controlling a characteristic frequency of a filter.

In the first example described above, an audio signal for an audio object that would be perceived as rotating around a center position may be generated by periodically changing a characteristic frequency (e.g., cutoff, resonance) of a filter that is applied to the audio signal. Then, a polar angle of the audio object (that can be used to derive appropriate cartesian coordinates) can be determined (e.g., calculated) based on the control signal that is used to modulate the characteristic frequency. Thereby, the spatial metadata is generated based on, at least in part, the one or more control signals (specifically, the control signal modulating the characteristic frequency of the filter).

In the second example described above, an audio signal for an audio object that would be perceived as moving through, for example, a room may be generating by using an amplifier for applying an envelope to the audio signal. Then, a time-dependent position, for example corresponding to a linear translation of the audio object (that can be used to derive appropriate cartesian coordinates) can be determined (e.g., calculated) based on the control signal that is used to modulate the gain of the amplifier. Specifically, the linear translation (or the time-dependent position, or the spatial metadata in general) may be generated based on a shape of the envelope (gain profile) represented by the control signal. Thereby, again, the spatial metadata is generated based on, at least in part, the one or more control signals (specifically, the control signal modulating the gain of the amplifier).

In a third example, multiple audio signals may be generated by multiple oscillators. Then, the relative spatial position of the oscillators' associated audio objects (i.e., relative to each other) can be modulated by an LFO that is also used for modulating their frequency. For example, as a filter that is applied to the audio signals opens and closes cyclically under control of the LFO, the objects will move towards and then away from each other cyclically. This relative movement may be appropriately reflected in the generated metadata for the multiple modified audio signals. Therein, again, the spatial metadata is generated based on, at least in part, the one or more control signals (specifically, the control signal generated by the LFO).

In a fourth example, multiple audio signals may be generated by multiple oscillators. Then, the relative spatial position of the oscillators' associated objects may be controlled by an envelope that also controls a cutoff of a filter that is applied to the audio signals. The envelope may be triggered by an attached keyboard, or other suitable means for receiving user input, for example. For example, when a key is first pressed, the oscillators' sound will appear to originate from the same spatial position, but as the key is continued to be held, the sound sources will appear to move away from each other spatially. As the sound sources get further removed from each other, the filter may open more, causing the sound(s) to become brighter. This relative movement may again be appropriately reflected in the generated metadata for the multiple modified audio signals. Therein, again, the spatial metadata is generated based on, at least in part, the one or more control signals (specifically, the control signal generated by the envelope).

In a fifth example, a random LFO shape may be used to control both a voice position and a wavetable of an oscillator generating the audio signal (i.e., voice). Over time the voice object will take random spatial positions, with each new position corresponding to a new wavetable. Random movement of the voice object may be appropriately reflected in the generated metadata for the audio signal. Therein, again, the spatial metadata is generated based on, at least in part, the one or more control signals (specifically, the control signal generated by the random LFO shape).

The output stage of the synthesizer (fourth stage) is an output stage for outputting the modified audio signal together with the generated spatial metadata. Specifically, the output stage may be adapted to output one or more audio streams based on the modified audio signal, together with, for each audio stream, corresponding spatial metadata as generated by the third stage. For example, there may be one spatial metadata stream for each output audio stream. When more than one audio signals are processed in parallel by the synthesizer 305, there may be one output audio stream for each (modified) audio signal. Alternatively, the modified audio signals may be mixed into audio streams for output. In such cases, appropriate spatial metadata may be generated for the resulting audio streams. Alternatively, the spatial metadata for the output audio stream may be generated based on the spatial metadata of the individual modified audio signals that are mixed into the output audio stream.

Alternatively or in addition, more than one audio signal (i.e., a plurality of audio signals) may be serially processed by the synthesizer 305. For example, in some such implementations, processing for a given audio signal may depend on an audio signal processed earlier and/or its metadata. As another example, in some implementations, the processing may involve modifying already existing spatial metadata of an audio signal that has been obtained by the first stage. In line with the above, this modification of the already existing metadata may be based on the internal control signals (internal modulation signals).

While the synthesizer 305 is described as outputting object-based audio content (i.e., the modified audio signal together with the generated spatial metadata), it may additionally be configured for output of rendered (e.g., channel-based) audio content. For example, the synthesizer 305 may be able to render a binaural output for previewing, or for direct multi-channel input to a public address system. Accordingly, the synthesizer may further comprise, in addition to the output stage, a rendering stage (or rendering unit, rendering module) for generating the rendered audio content. It is however to be understood that the rendering stage is optional and that the synthesizer may typically provide object-based audio content for external rendering.

Figure 4:
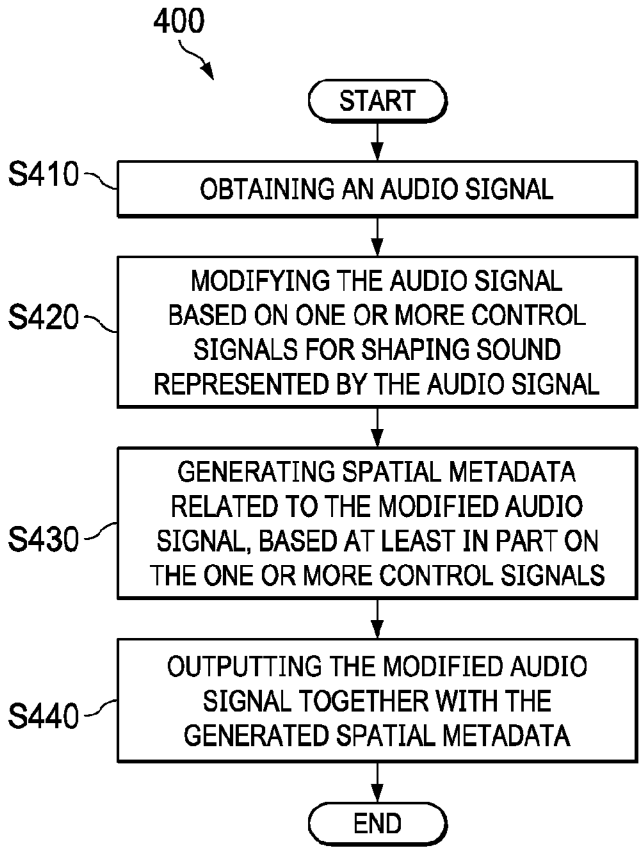
FIG. 4 is a flowchart schematically illustrating an example of a method of generating and/or processing audio signals according to embodiments of the disclosure.

A corresponding method 400 of generating or processing audio signals is schematically illustrated in the flowchart of FIG. 4. Method 400 comprises steps/processes S410 through S440.

At step S410, an audio signal is obtained. As noted above, this may involve generating or receiving the audio signal.

At step S420, the audio signal is modified based on one or more control signals for shaping sound represented by the audio signal.

At step S430, spatial metadata relating to the modified audio signal is generated, based at least in part on the one or more control signals.

Finally, at step S440, the modified audio signal is output together with the generated spatial metadata.

It is understood that step S410 may be performed by the first stage of the above-described apparatus for generating or processing audio signals, step S420 may be performed by the second stage, step S430 may be performed by the third stage, and step S440 may be performed by the output stage. It is further understood that any statements made above with respect to respective stages likewise apply to their corresponding method steps/processes and that repeated description may be omitted for reasons of conciseness.

Figure 5:
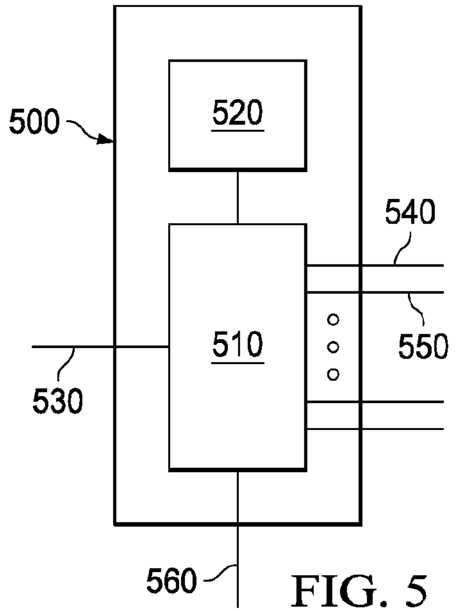
FIG. 5 is a block diagram of an apparatus for performing methods according to embodiments of the disclosure.

The present disclosure likewise relates to apparatus (e.g., synthesizer, audio processor) for performing methods and techniques described throughout the disclosure. FIG. 5 shows an example of such apparatus 500. Said apparatus 500 comprises a processor 510 and a memory 520 coupled to the processor 510. The memory 520 may store instructions for the processor 510. The processor 510 may optionally receive an input 530 from an external source, such as a database. The input 530 may relate to sound signals, for example. Further, the processor 510 may receive user input 560, for example via suitable interface(s) (e.g., keyboard, control panel, etc.). The user input may modify sound generation or sound shaping, as described above. The processor 510 may be adapted to carry out the methods/techniques described throughout this disclosure. Accordingly, the processor 510 may output one or more (modified) sound signals (audio streams) 540 and associated metadata (metadata streams) 550.

The present disclosure likewise relates to a computer program comprising instructions that when carried out by a computer processor would cause the computer processor to carry out the method described throughout the disclosure, and to a computer-readable storage medium storing said computer program.

Embodiments of the present disclosure may have in common that the (same) internal control signals (internal modulation signals) that are used for controlling generation and/or modification/shaping of audio signals are also used for generating spatial metadata for the audio signals. Compared to cases in which the control signals are not available for generating the spatial metadata and in which any previous shaping operations applied to the audio signals are finalized to a channel-based output (e.g., mono, stereo, or possibly multi-channel), this allows for additional flexibility in implementing creative intent and can help to avoid laborious manual and potentially sub-optimal editing of spatial metadata.

Interpretation

Aspects of the systems described herein may be implemented in appropriate computer-based sound processing systems for generating and/or processing sound signals. One or more of the components, blocks, processes or other functional components may be implemented through one or more computer programs that control execution of one or more processor-based computing devices of the system. It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media.

Specifically, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more electronic processors, such as a microprocessor and/or application specific integrated circuits ("ASICs"). As such, it should be noted that a plurality of hardware and software-based devices, as well as a plurality of different structural components, may be utilized to implement the embodiments. For example, blocks or stages described herein can include one or more electronic processors, one or more computer-readable medium modules, one or more input/output interfaces, and various connections (e.g., a system bus) connecting the various components.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

Enumerated Example Embodiments

Various aspects and implementations of the present disclosure may also be appreciated from the following enumerated example embodiments (EEEs), which are not claims.

EEE1. An apparatus for generating or processing audio signals, the apparatus comprising: a first stage for obtaining an audio signal; a second stage for modifying the audio signal based on one or more control signals for shaping sound represented by the audio signal; a third stage for generating spatial metadata related to the modified audio signal, based at least in part on the one or more control signals; and an output stage for outputting the modified audio signal together with the generated spatial metadata.

EEE2. The apparatus according to EEE1, wherein the one or more control signals are time-dependent.

EEE3. The apparatus according to EEE1 or EEE2, wherein the spatial metadata is metadata for instructing an external device on how to render the modified audio signal.

EEE4. The apparatus according to any one of EEE1 to EEE3, wherein the second stage is adapted to apply a time-dependent modification to the audio signal, with the time dependency of the modification depending on the one or more control signals.

EEE5. The apparatus according to any one of EEE1 to EEE4, wherein the second stage comprises at least one of the following for modifying the audio signal: a filter; an amplifier; a low frequency oscillator; an audio delayer; a driver; and/or a flanger.

EEE6. The apparatus according to any one of EEE1 to EEE5, wherein the second stage is adapted to apply a filter to the audio signal; and wherein a characteristic frequency of the filter is controlled by the one or more control signals.

EEE7. The apparatus according to EEE6, wherein the characteristic frequency of the filter is a cutoff frequency.

EEE8. The apparatus according to any one of EEE1 to EEE7, wherein the second stage is adapted to apply an amplifier to the audio signal; and wherein a gain of the amplifier is controlled by the one or more control signals.

EEE9. The apparatus according to EEE8, wherein the second stage is adapted to apply an envelope to the audio signal by using the amplifier; and wherein the third stage is adapted to generate the spatial metadata based at least in part on a shape of the envelope.

EEE10. The apparatus according to any one of EEE1 to EEE9, wherein obtaining the audio signal comprises generating the audio signal by using one or more oscillators.

EEE11. The apparatus according to EEE10, wherein the audio signal is generated, by the one or more oscillators, based at least in part on the one or more control signals.

EEE12. The apparatus according to any one of EEE1 to EEE9, wherein obtaining the audio signal comprises receiving the audio signal.

EEE13. The apparatus according to any one of EEE1 to EEE12, wherein the one or more control signals are based at least in part on user input.

EEE14. The apparatus according to any one of EEE1 to EEE13, wherein the output stage is adapted to output one or more audio streams based on the modified audio signal, together with the generated spatial metadata.

EEE15. A method of generating or processing audio signals, the method comprising: obtaining an audio signal; modifying the audio signal based on one or more control signals for shaping sound represented by the audio signal; generating spatial metadata related to the modified audio signal, based at least in part on the one or more control signals; and outputting the modified audio signal together with the generated spatial metadata.

EEE16. The method according to EEE15, wherein the one or more control signals are time-dependent.

EEE17. The method according to EEE15 or EEE16, wherein the spatial metadata is metadata for instructing an external device on how to render the modified audio signal.

EEE18. The method according to any one of EEE15 to EEE17, wherein modifying the audio signal comprises applying a time-dependent modification to the audio signal, with the time dependency of the modification depending on the one or more control signals.

EEE19. The method according to any one of EEE15 to EEE18, comprising modifying the audio signal by at least one of: a filter; an amplifier; a low frequency oscillator; an audio delayer; a driver; and/or a flanger.

EEE20. The method according to any one of EEE15 to EEE19, wherein modifying the audio signal comprises applying a filter to the audio signal; and wherein a characteristic frequency of the filter is controlled by the one or more control signals.

EEE21. The method according to EEE20, wherein the characteristic frequency of the filter is a cutoff frequency.

EEE22. The method according to any one of EEE15 to EEE21, wherein modifying the audio signal comprises applying an amplifier to the audio signal; and wherein a gain of the amplifier is controlled by the one or more control signals.

EEE23. The method according to EEE22, wherein modifying the audio signal comprises applying an envelope to the audio signal by using the amplifier; and wherein generating the spatial metadata is based at least in part on a shape of the envelope.

EEE24. The method according to any one of EEE15 to EEE23, wherein obtaining the audio signal comprises generating the audio signal by using one or more oscillators.

EEE25. The method according to EEE24, wherein the audio signal is generated, by the one or more oscillators, based at least in part on the one or more control signals.

EEE26. The method according to any one of EEE15 to EEE23, wherein obtaining the audio signal comprises receiving the audio signal.

EEE27. The method according to any one of EEE15 to EEE26, wherein the one or more control signals are based at least in part on user input.

EEE28. The method according to any one of EEE15 to EEE27, wherein outputting the modified audio signal comprises outputting one or more audio streams based on the modified audio signal, together with the generated spatial metadata.

EEE29. A computer program comprising instructions that when carried out by a computer processor would cause the computer processor to carry out the method according to any one of EEE15 to EEE28.

EEE30. A computer-readable storage medium storing the computer program according to EEE29.

The invention claimed is:

1. An apparatus for generating or processing audio signals, the apparatus comprising:
- a first module for obtaining an audio signal;
- a second module for modifying the audio signal based on one or more control signals configured for shaping sound represented by the audio signal;
- a third module for generating, with an electronic processor, spatial metadata related to the modified audio signal, based at least in part on the one or more control signals; and
- an output module for outputting the modified audio signal together with the generated spatial metadata.

2. The apparatus according to claim 1, wherein the one or more control signals are time-dependent.

3. The apparatus according to claim 1, wherein the spatial metadata is metadata for instructing an external device on how to render the modified audio signal.

4. The apparatus according to claim 1, wherein the second module is adapted to apply a time-dependent modification to the audio signal, with the time dependency of the modification depending on the one or more control signals.

5. The apparatus according to claim 1, wherein the second module comprises at least one of the following for modifying the audio signal:
- a filter;
- an amplifier;
- a low frequency oscillator;
- an audio delayer;
- a driver; and/or
- a flanger.

6. The apparatus according to claim 1, wherein the second module is adapted to apply a filter to the audio signal; and
- wherein a characteristic frequency of the filter is controlled by the one or more control signals and/or the characteristic frequency of the filter is a cutoff frequency.

7. The apparatus according to claim 1, wherein the second module is adapted to apply an amplifier and/or an envelope via the amplifier to the audio signal;
- wherein a gain of the amplifier is controlled by the one or more control signals; and wherein the third module is adapted to generate the spatial metadata based at least in part on a shape of the envelope.

8. The apparatus according to claim 1, wherein obtaining the audio signal comprises generating the audio signal by using one or more oscillators based at least in part on the one or more control signals.

9. The apparatus according to claim 1, wherein the one or more control signals are based at least in part on user input.

10. The apparatus according to claim 1, wherein the output module is adapted to output one or more audio streams based on the modified audio signal, together with the generated spatial metadata.

11. The apparatus according to claim 1, wherein the control signals are generated by one or more modulators.

12. The apparatus according to claim 1, wherein the output module outputs the modified audio signal together with the generated spatial metadata to an audio rendering device.

13. A method of generating or processing audio signals, the method comprising:

obtaining an audio signal;

modifying the audio signal based on one or more control signals configured for shaping sound represented by the audio signal;

generating, with an electronic processor, spatial metadata related to the modified audio signal, based at least in part on the one or more control signals; and outputting the modified audio signal together with the generated spatial metadata.

14. The method according to claim 13, wherein the one or more control signals are time-dependent.

15. The method according to claim 13, wherein the spatial metadata is metadata for instructing an external device on how to render the modified audio signal.

16. The method according to claim 13, wherein modifying the audio signal comprises applying a time-dependent modification to the audio signal, with the time dependency of the modification depending on the one or more control signals.

17. The method according to claim 13, comprising modifying the audio signal by at least one of: a filter; an amplifier; a low frequency oscillator; an audio delayer; a driver; and/or a flanger.

18. The method according to claim 13, wherein modifying the audio signal comprises applying a filter to the audio signal; and wherein a characteristic frequency of the filter is controlled by the one or more control signals and/or the characteristic frequency of the filter is a cutoff frequency.

19. The method according to claim 13, wherein modifying the audio signal comprises applying an amplifier and/or an envelope via the amplifier to the audio signal;

wherein a gain of the amplifier is controlled by the one or more control signals; and wherein generating the spatial metadata is based at least in part on a shape of the envelope.

20. The method according to claim 13, wherein obtaining the audio signal comprises generating the audio signal by using one or more oscillators based at least in part on the one or more control signals.

21. The method according to claim 13, wherein the one or more control signals are based at least in part on user input.

22. The method according to claim 13, wherein outputting the modified audio signal comprises outputting one or more audio streams based on the modified audio signal, together with the generated spatial metadata.

23. The method according to claim 13, further comprising generating, by one or more modulators, the one or more control signals.

24. The method according to claim 13, wherein obtaining the audio signal includes obtaining, with a synthesizer, the audio signal.

25. The method according to claim 13, wherein outputting the modified audio signal together with the generated spatial metadata includes outputting, with a synthesizer, the modified audio signal together with the generated spatial metadata to an audio rendering device.

* * * * *